United States Patent [19]

Nishitani

[11] 4,287,558
[45] Sep. 1, 1981

[54] SAMPLED DATA PROCESSING SYSTEM HAVING MEMORY WITH AREAS ALTERNATELY DEDICATED TO DATA I/O AND DATA PROCESSING

[75] Inventor: Takao Nishitani, Tokyo, Japan
[73] Assignee: Nippon Electric Co., Ltd., Tokyo, Japan
[21] Appl. No.: 944,635
[22] Filed: Sep. 21, 1978
[30] Foreign Application Priority Data
    Sep. 29, 1977 [JP] Japan ............................... 52-117611
[51] Int. Cl.³ .......................... G06F 3/05; G06F 13/00
[52] U.S. Cl. .................................................. 364/200
[58] Field of Search ... 364/200 MS File, 900 MS File
[56] References Cited

U.S. PATENT DOCUMENTS

| 3,079,590 | 2/1963 | Confeld | 364/900 |
|---|---|---|---|
| 3,209,332 | 9/1965 | Doersam, Jr. | 364/900 |
| 3,293,613 | 12/1966 | Gabor | 364/900 |
| 3,344,406 | 9/1967 | Vinal | 364/900 |
| 3,369,223 | 2/1968 | Dryden | 364/900 |
| 3,631,406 | 12/1971 | Kurner | 364/200 |
| 3,736,568 | 5/1973 | Snook | 364/900 |
| 4,003,027 | 1/1977 | DiMattgo | 364/900 |
| 4,087,626 | 5/1978 | Brader | 364/900 X |

OTHER PUBLICATIONS

Atal et al., "Adaptive Predictive Coding of Speech Signals" in *The Bell System Tech. Journal*, Oct. 1970, pp. 1973-1986.
*Model 70 User's Manual*, Interdata Inc. Publication No. 29,261, Sep. 1971, pp. 2-4 and 2-5.
Inter Series 3000 Ref. Manual, "Schottky Bipolar LSI Microcomputer Set", p. 2-1, 2-3, 2-15, 2-17, Intel Corp., 1976.
Duttweiler et al.; "Nearly Instantaneous Companding for Nonuniformly Quantized PCM" in *IEEE Trans. on Computers*, vol. Com-24, No. 8, Aug. 1976, pp. 864-873.

*Primary Examiner*—Melvin B. Chapnick
*Attorney, Agent, or Firm*—Laff, Whitesel & Rockman

[57] ABSTRACT

A system for processing data received in the form of sample pulses has a memory with first and second major memory areas. A buffer register stores data temporarily to enable an interface between the timing of the system and of a sampled analog signal. A central processor processes data stored in one major memory area while data stored in the other major memory area is being transferred between the memory and the buffer register. The data transfer occurs during time periods while the central processor does not have access to the memory. One data item is outputted for each sample pulse received. This way, the cycle time of the sample pulses may be much greater than the cycle time of the central processor.

2 Claims, 9 Drawing Figures

SAMPLED DATA PROCESSING SYSTEM HAVING MEMORY WITH AREAS ALTERNATELY DEDICATED TO DATA I/O AND DATA PROCESSING

BACKGROUND OF THE INVENTION

The present invention relates to a data processing system for transferring data between a central processing unit ("CPU") operating at a high speed and input-/output units operating at a low speed and, more particularly, to a system for processing one data item for each sampling period input/output operations.

When an analog signal (such as a radar signal) returns from the surface of the sea to be digitally processed, the Nyquist sampling frequency is equal to twice the highest frequency of the analog signal which is sampled. The sampled signal is first subjected to fast Fourier transform or a fast Walsh transform to be transformed into a frequency-domain signal. Then, it is inversely transformed, if necessary. Alternatively, the sampled signal is subjected to nearly instantaneous companding or adaptive predictive coding to reduce the number of bits to be transmitted by using its correlated values for a short period of the sampled signal. In this case, while data must be inputted or outputted, one by one, at every sampling time, the processing must be applied on a data block basis, i.e., to data blocks, each including several data items.

For details of the above-mentioned nearly instantaneous companding and adaptive predicitive coding, reference is made to an article entitled "Nearly Instantaneous Companding for Non-uniformly Quantized PCM" published in IEEE TRANSACTIONS ON COMMUNICATIONS, Vol. Com-24, No. 8, August 1976, pages 864 to 873 and another article entitled "Adaptive Predictive Coding of Speech Signals" published in THE BELL SYSTEM TECHNICAL JOURNAL, October 1970, pages 1973 to 1986.

For the above-mentioned fast Fourier transform, assume first that: an N-point data series $\{Xi|i=0, 1, \ldots, N-1\}$ is expressed by a column vector $X$; a diagonal matrix with diagonal elements of weighting coefficients $\{Wi|i=0, 1, \ldots, N-1\}$ corresponding to the impulse response of a filter, by diag $\{Wi\}$; a transform matrix for an N-point inverse fast Fourier transform by $|F^{-1}|$; and an N-point output data series $\{Xi'|i=0, 1, \ldots, N-1\}$, by a column vector $X'$, respectively. Then, the following relation is established:

$$X' = |F^{-1}| \cdot \text{diag}\{Wi\} \cdot |F| \cdot X \quad (1)$$

As seen from equation (1), to calculate the column matrix $X'$, all the values of $X$ (i.e., N-point data series Xi) must be prepared.

The apparatus for controlling the one-data-for-each-data-block input/output operations may incorporate the program channel unit described on pages 2 to 5 of the "Model 70 User's Manual" issued by INTERDATA INC., USA, 1971. The input/output data control is carried out by using an interruption and an interruption processing program. The manual also describes (pages 2 to 4) a direct memory access channel unit in which a memory is directly connected to input/output buffers in the input/output units in order to transfer a block of data at a high speed.

However, if such units are used for the block of data processing, there are the following disadvantages:

A. When the program channel unit is used, the one-data-for-each-sampling-period processing is achieved by outputting the data processed during the preceding sampling period and by inputting the succeeding data for processing at the central processing unit during the next sampling period, even if the central processing unit is operating. For this reason, the program channel unit notifies the central processing unit of an interruption. Then, the central processing unit halts the program currently being executed. Thus, there are two time-sections; one for the equation (1) execution and the other for the program control to execute input-output instructions. However, the input/output operations of data are frequently performed. As a result, the program control time is relatively longer than the time required to execute equation (1). This time differential adversely affects the efficiency of the central processing unit operation.

B. When the direct memory access channel unit is used, there is less deterioration of efficiency because it has a high-speed data transfer capability. Additionally, with respect to the input/output data, a block of data used to perform the function of equation (1) may be transferred at one time. In this respect, the direct memory access channel unit is more effective than the program channel unit. However, data must be inputted and outputted one by one for each sampling time. Therefore, the input/output units need a large-capacity buffer memory and a control system for controlling the data according to the data input/output operations, thereby requiring a great amount of hardware.

SUMMARY OF THE INVENTION

Therefore, an object of the invention is to provide a data processing system which is free from the above-mentioned disadvantages.

According to one aspect of the present data processing system, the sampling time is several hundred to several thousand times greater than the cycle time of the central processing unit. Therefore, there is at least one cycle time period when the central processing unit does not have access to a main memory during one sampling period. During this cycle time, the sampled data is inputted or outputted and thus the input/output ("I/O") operations may be performed without interrupting the processing time of the central processing unit. Also, an input/output memory area of one data block is provided in the main memory so that the memory capacity of the buffer registers in the input/out units becomes sufficient for storing only one data.

BRIEF DESCRIPTION OF THE DRAWINGS

The invention will be described in connection with the accompanying drawings, in which.

DESCRIPTION OF THE PREFERRED EMBODIMENT

Figure 1:
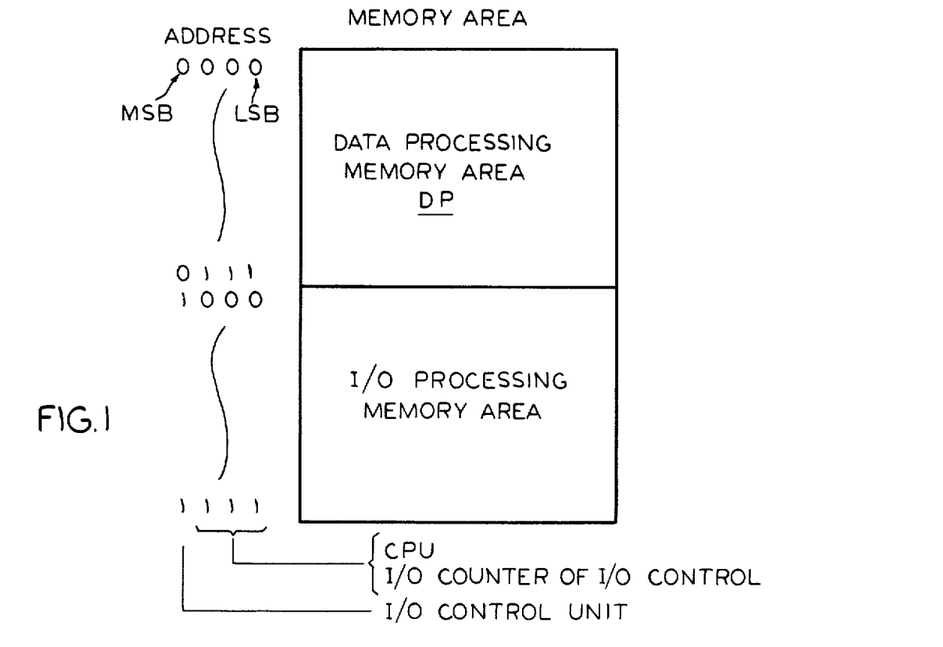
FIGS. 1 and 2(a) through 2(d) are graphical diagrams for illustrating the operating principles of the invention.

FIG. 1 shows a memory map of a main memory having two major memory areas, each containing a plurality of memory storage areas or locations, from addresses 0 to 15. The major memory areas are alternatively used as a data processing memory area and then as an input/output memory area. This division of the memory area is based on the most significant bit ("MSB") of an address supplied from an input/output control unit, independently of a central processing unit. Other than the most significant bit, the address bits are supplied from the central processing unit or an input/output counter in the input/output ("I/O") control unit. Since the most significant bits of the main memory addresses (FIG. 1) are not coupled with the central processing unit, the central processing unit takes the main memory to a memory with addresses 0 to 7 (represented by binary "000" to "111"). Thus, it cannot distinguish the data processing ("DP") memory area from the input/output (I/O) memory area. For this reason, discrimination is provided by a signal from the I/O control unit, to be described later in detail. When the input/output operations are not performed, the I/O control unit designates the data processing memory area in the main memory by a most significant bit signal of the address. As a result, the central processing unit constantly accesses the data processing memory area.

The central processing unit operates the main memory or an arithmetic and logic unit during its job execution. In the operation of the central processing unit, there is a time period when the main memory is not accessed by the central processing unit or, in other words, when data is transferred between scratch-pad memories in the arithmetic and logic unit, independently of the main memory. Particularly, if a signal (such as a speech signal) is processed in the digital form, one data is merely inputted and outputted for each sampling time (125 microseconds). During this sampling time, the central processing unit executes between several hundred and several thousand steps. Therefore, there is at least one step during which the main memory is not accessed by the central processing unit.

After a sampling pulse is given, the central processing unit detects a time period during which the central processing unit does not access the main memory. The I/O control unit loads the most significant bits of the main memory address bits into the I/O memory area of the main memory. An input/output (I/O) counter included in the I/O control unit feeds all other address bits which identify individual storage area or locations. As a result, one of the addresses in the I/O memory area is selected to output the data which is located in the storage area or location selected by the address, and which has been processed. Data to be processed next is loaded into that addressed I/O memory location. After completion of the I/O operations, the I/O counter is advanced by one count. At the next sampling time, any data which has not yet been outputted is given from the memory, and preparation work is carried out for loading new data into the memory.

For data processing, the processing by the central processing unit (e.g., the operation of equation (1)) must be completed within the time period corresponding to the product of the sampling time and the number of data items contained in one data block. Otherwise, the data which has not yet been processed would be lost in the central processing unit, with the lapse of time (i.e., the memory capacity limitation of the scratch-pad memories). Then, a point is reached when the central processing unit can no longer process data on a real time base. For this reason, the I/O counter is advanced by the counting steps corresponding to several data items in the data block. After the I/O operations of one block are completed, the new data of one block are already loaded into the I/O memory area in the main memory. The central processing unit has then completed the data processing of one data block in the data processing memory area.

In this invention, in response to the completion of the I/O operations of one data block, the I/O control unit reverses the signal state for feeding the most significant bit of the address bits for distinguishing the I/O memory area from the data processing memory area. Specifically, assume now that, when the central processing unit gives access to the main memory, the most significant bit of the memory address is a logical "0." When the I/O operations are performed by the I/O control unit, the most significant bit of the main memory is a logical "1." In this case, the data processing memory area is assigned to the first half of the main memory and the I/O memory area to the latter half. In such a case, the most significant bit of the main memory address bits is changed from logical "0" to "1" when the central processing unit makes access to the main memory and the most significant bit of the main memory address bits is changed from logical "1" to "0" when the I/O operations are conducted by the I/O control unit. As a result, the first half area of the main memory serves as the I/O memory and the second half area as the data processing memory area. Then, the I/O control unit sends a data-ready completion signal or an input/output completion signal to the central processing unit. Upon receipt of such a data-ready signal, the central processing unit starts processing new data stored in the latter half memory area.

Figure 2:
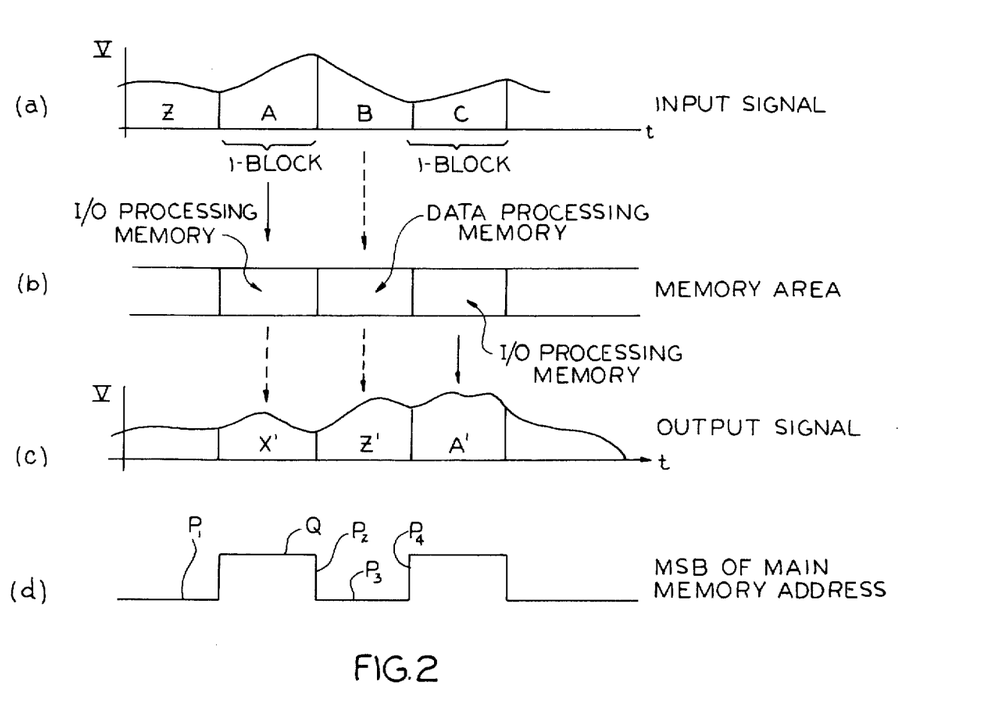

FIGS. 2(a) through 2(d) illustrate the relationship between input and output signals and the change of the memory areas. The input signal of FIG. 2(a) is progressively processed for every data block in the order of A, B and C. For example, a signal representing the block A is sampled and the sampled data are inputted one by one during the time period when the most significant bit of the main memory address bits supplied from the I/O control unit is a logical "1," that is to say, when the latter half of the main memory area is the I/O memory area (Q of FIG. 2(d)). At this time, the signal which was inputted before the last two data blocks, and has been processed, is given as an output signal X' (FIG. 2(c)). The sampled data of the block Z (one block before the described Block A) are stored in the data processing memory area and currently are being processed by the central processing unit.

The trailing edge $P_2$ (FIG. 2(d)) of the most significant bit of the main memory address, supplied from the I/O control unit, occurs as soon as the sampled data of the block A have been inputted. For convenience of expression this trailing edge $P_2$ is referred to as "inverting the output signal of the memory selection means." Therefore, the latter half area $P_3$ (FIG. 2(d)) of the main memory, into which all the sampled data of the block A have been loaded, becomes the data processing memory area. At the same time, the first half of the main memory area becomes the I/O memory area and the I/O control unit produces all the data of the block Z which have been processed by the central processing unit (Z' of FIG. 2(c)), while simultaneously the new data of the data block B are being inputted as shown in FIG. 2(a).

The leading edge $P_4$ (FIG. 2(d)) of the signal carrying the main memory address supplied from the I/O control unit occurs immediately after all the sampled data of the block B have been inputted. The latter half of the memory area storing the data of the block A processed by the central processing unit becomes the I/O memory area (FIG. 2(b)). The I/O control unit produces all the data of the block A as illustrated at A' of FIG. 2(c). In this manner, the input signal is continuously processed on a real time basis, to be given as an output signal.

Alternately odd and even addresses may be assigned to the I/O memory area and the data processing memory area. The least significant bit ("LSB") of the address bits may be used as the signal which is supplied directly from the I/O control unit to the main memory.

Figure 3:
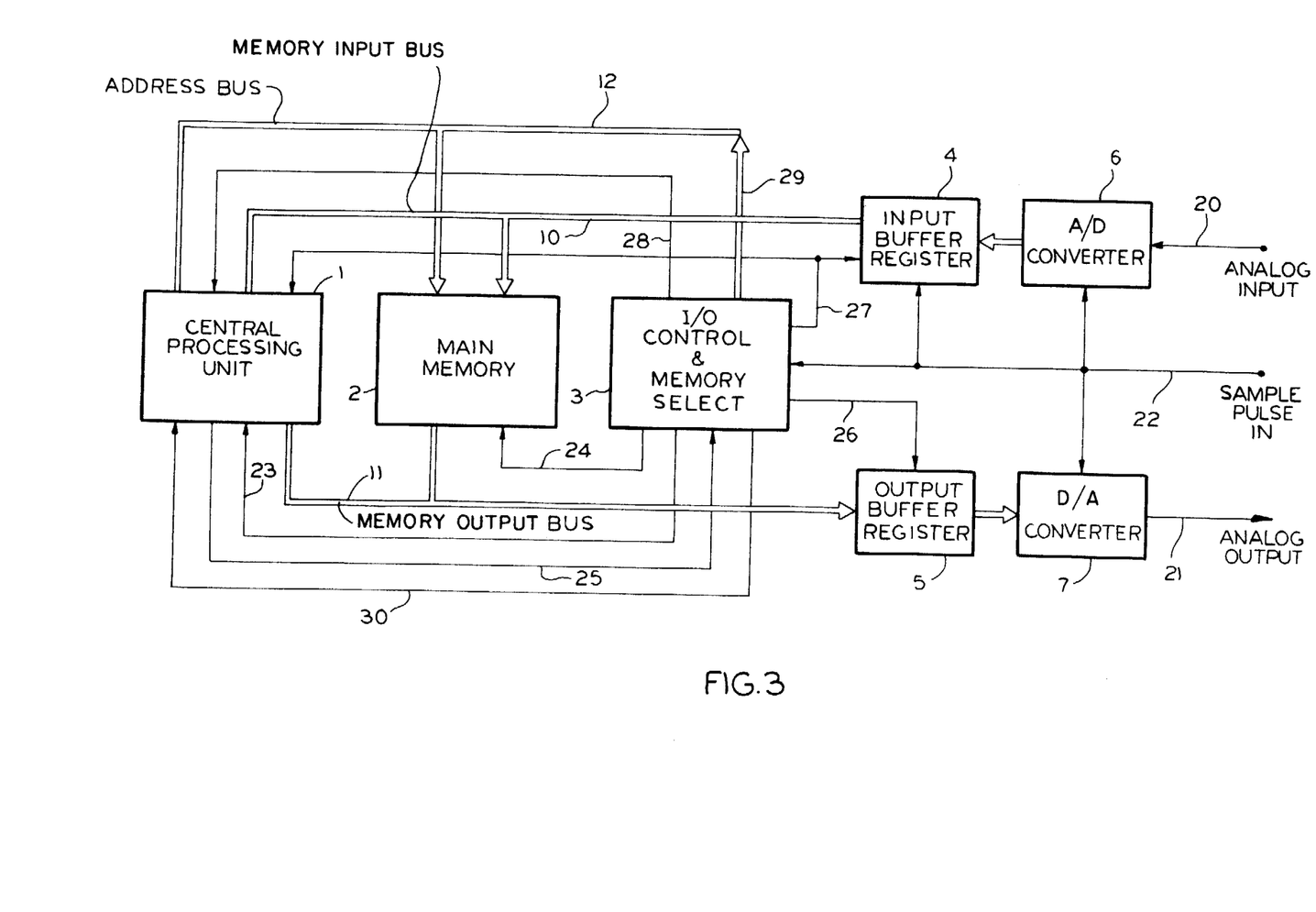
FIG. 3 is a block diagram of an embodiment of the invention.

FIG. 3 shows one embodiment of the present invention which includes a central processing unit 1, a main memory 2, an I/O control unit 3, an input buffer register 4, an output buffer register 5, an analog to digital converter 6, a digital to analog converter 7, a memory input bus 10, a memory output bus 11, an address bus 12, an analog signal input line 20, an analog signal output line 21, a sampling pulse input line 22, an I/O completion signal line 23, a memory write signal line 24, a vacant time signal line 25, an output buffer strobe line 26, an input buffer activation signal line 27, a memory selection signal line 28, an I/O address signal line 29, and an address selection signal line 30.

As will be described later, the memory selection signal line 28 and the I/O address signal line 29 receive the output signals of the memory selection circuit 3 and the contents of the I/O counter in the I/O control unit 3 to be described later in detail. If the central processing unit 1 uses the main memory 2, a signal on the signal line 28 is added as the most significant bit to the address bits given from the central processing unit 1 and is transferred over the address bus 12. On the other hand, when the I/O control unit 3 performs the I/O operations, a signal on the I/O signal line 29 is transferred over the address bus 12. A logical NOT signal on the signal line is transferred to the most significant bit side of the I/O signal line 29 and the outputs of the I/O counter are delivered to the remaining signal lines of the I/O signal line 29.

The operation of the I/O control unit 3 is given when the signal on the memory selection signal line 28 is a logical "0" ($P_1$ in FIG. 2(d)). The control unit 3 does not operate until a sampling pulse is sent to the sampling pulse input line 22. Therefore, when the central processing unit 1 makes access to the main memory 2 through the address bus 12, the signal line 28 is connected to the most significant bit side of the transmission line of the address bus 12. The central processing unit 1 gives access to the first half of the main memory 2 (see FIG. 1), since the signal on the signal line 28 is a logical "0". At this time, the data processing memory area corresponds to the first half of the main memory 2. In this state, if a sampling pulse is applied to the sampling pulse input line 22, the analog signal received from the analog signal input line 20 is converted into a digital signal by the analog to digital ("A/D") converter 6. The converter digital signal produced by the analog to digital converter 6 is transferred before one sampling pulse to the input buffer register 4.

The data stored in the output buffer register 5 is converted into an analog signal by a digital to analog ("D/A") converter 7 and sent out onto the analog signal output line 21 in synchronism with the input sampling pulse. The sampling pulse appears on the sampling pulse input line 22 and is inputted into the I/O control unit 3 to prepare it for I/O operations.

As soon as the control unit 3 is ready for the I/O operations and the processing unit 1 executes an operation without the main memory 2, the processing unit 1 notifies the unit 3 over the vacant time signal line 25. The address selection signal line 30 inhibits the address information given from the central processing unit 1, and the I/O address signal line 29 is connected to the address bus 12. The logical NOT signal, on the memory selection signal line 28, is transferred onto the most significant bit side transfer line of the signal line 29. The transfer line becomes a logical "1" and thus the unit 3 specifies the address in the latter half area of the main memory 2, via the address bus 12 (FIG. 1). That is, it specifies the I/O memory area of the main memory 2. To the data output bus 11 is transmitted the already processed data which is stored in the address of the main memory 2. The control unit 3 transfers a strobe signal through the output buffer strobe line 26 to the output buffer register 5. Register 5 receives the data stored in the address of the main memory 2 via the data output bus 11 when the strobe signal is given to the register 5.

The address bus 12 is again used by the central processing unit 1 to access the memory 2 until the next vacant time signal is supplied through the vacant time signal line 25 to the control unit 3. The vacant time signal is then applied through the vacant time signal line 25 to the unit 3. The I/O signal line 29 is again connected to the address bus 12, under the control of a signal delivered through the address control signal line 30. The signal on the I/O signal line 29 indicates the address where the data previously transferred to the buffer register 5 has been stored.

In order to transfer the data stored in the buffer register 4 into the address location of the main memory 2 via the memory input bus 10, the control unit 3 couples the input buffer register 4 to the memory input bus 10, depending on the signal on the input buffer activation signal line 27. At the same time, unit 3 issues a command to inhibit the data output of the central processing unit 1, and delivers a write command to the main memory 2 via the write signal line 24.

After the transfer of the data in the input buffer register 4 to the memory 2, the control unit 3 advances the I/O counter (included in the unit 3) by one count. The I/O counter gives the address bits other than the most significant bit to the signal line 29. Accordingly, when the unit 3 initiates the I/O operations, the address sent to the main memory 2 is one count larger than that of the main memory address previously inputted and outputted. Thus, any data which has not yet been outputted is now outputted in preparation for the next I/O operations, to enable the entry of new data. This is the reason why the I/O counter is advanced by one count. After such a preparation is completed, the unit 3 ignores the signal on the vacant time signal line 25 which is fed from the central processing unit 1, until the next sampling pulse is given.

As soon as the content of the I/O counter in the unit 3 becomes larger than the data block length, the pulse Q (FIG. 2(d)) terminates to indicate the state of the memory selection circuit in the unit 3 (P₂ in FIG. 2(d)). The I/O counter is reset and the unit 3 marks the I/O completion signal line 23. The central processing unit 1 responds to the signal on line 23 to indicate a completion of the I/O operations of one block data. To effect the real time signal processing, it is necessary to indicate that the data of one block stored in the data processing memory area has already been processed. The output signal of the memory selection circuit is transferred to the memory selection signal line 28 which is also used for the most significant bit side of the signal transmission line in the address bus 12. Thus, when the trailing edge P₂ is given to the central processing unit 1, it accesses the data processing area in the memory 2. The access of the central processing unit 1 is changed from the first half to the latter half area of the main memory. In other words, the memory selection circuit reassigns the data processing memory area to the latter half of the main memory 2 and the I/O memory area to the first half of it. Until the unit 3 informs the central processing unit 1, by way of the I/O completion signal line 23, that the I/O operations of one block of data are completed, the central processing unit 1 processes the data in the previous data processing memory area, as mentioned above. Thus, the central processing unit 1 initiates its processing of the data in the new data processing memory area, upon detection of the signal on the signal line 23.

The above-mentioned operation is repeated for each sampling time so that the data I/O operations are effected for the real time signal processing.

Figure 4A:
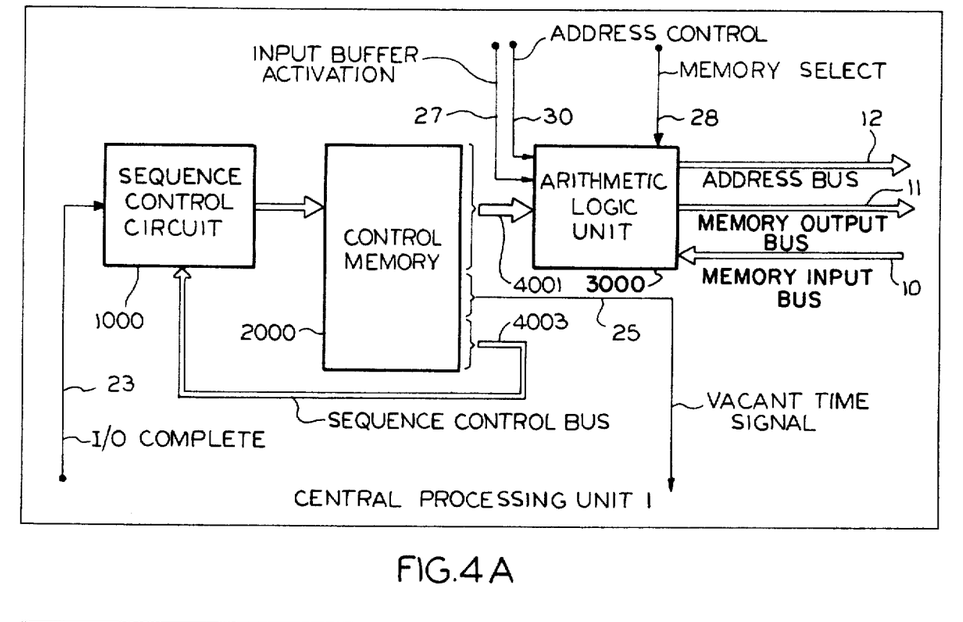
FIG. 4A is a block diagram of a central processing unit employed in the embodiment of FIG. 3

FIG. 4A shows an example of the central processing unit 1 which has a sequence control circuit 1000, a control memory 2000, an arithmetic logic unit 3000, an arithmetic and logic unit control line 4001, the vacant time signal line 25, a sequence control bus 4003, the memory input bus 10, the memory output bus 11, the address bus 12, the I/O completion signal line 23, the input buffer activation signal line 27, the memory selection signal line 28 and the address control signal line 30.

The sequence control circuit 1000, the control memory 2000, and the arithmetic and logic unit 3000 may be the Model 3001 MCU, Micro-program Memory and Model 3002 CP Array described in the "Intel Series 3000 Reference Manual" issued in 1976 by Intel Corporation, page 2-1. The sequence control circuit 1000 reads out an instruction which is to be executed from the control memory 2000. The control instruction is read out of the memory 2000 to provide a signal to the arithmetic and logic unit control line 4001 for controlling the arithmetic and logic unit 3000, the vacant time signal line 25, and the control circuit bus 4003 for controlling the control circuit 1000. The control unit 3 (FIG. 3) responds and applies a signal to the signal line 27 and the address control line 30. Such a signal cooperates with the signal on the arithmetic and logic unit control line 4001 to control the arithmetic and logic unit 3000, thereby inhibiting the arithmetic and logic unit 3000 from producing an output signal toward the memory input bus 11 and the address bus 12. The vacant time signal line 25 is connected to the control memory 2000 of FIG. 4A. The I/O completion signal line 23 (FIG. 3) and the control circuit bus 4003 (FIG. 4A) bear signals for informing the sequence control circuit 1000 as to the starting time point for processing a new data block.

Figure 4B:
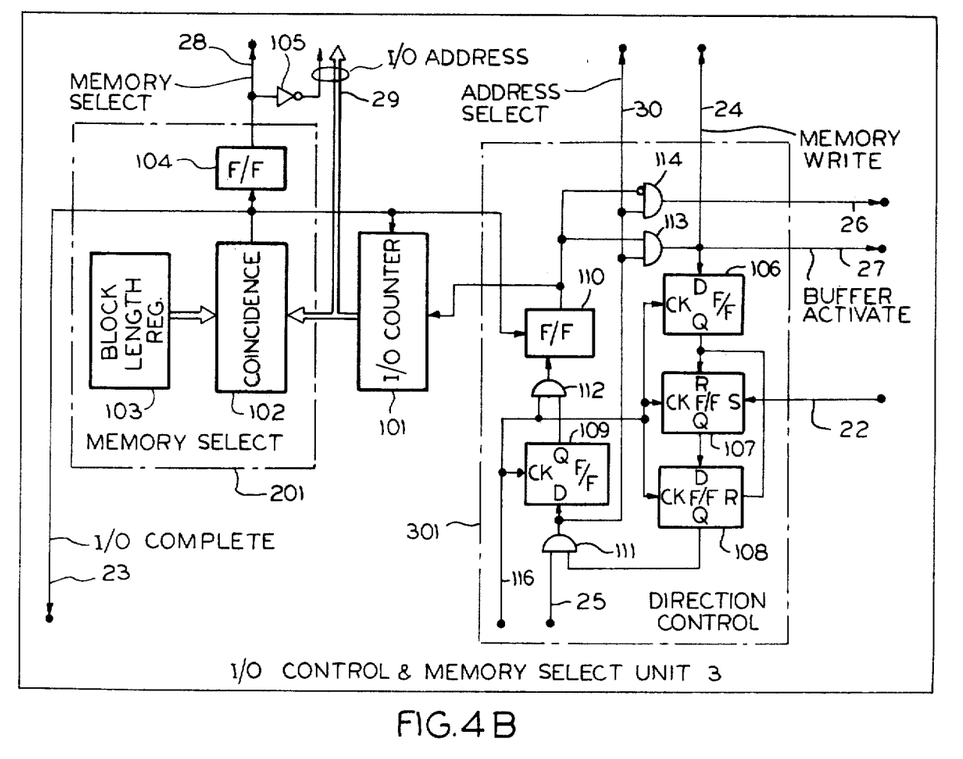
FIG. 4B is a block diagram of an input/output control unit employed in the embodiment of FIG. 3.

FIG. 4B shows the I/O control (and memory select) unit 3, which includes an I/O counter 101, a memory selection circuit 201 including a block-length set-up register 103 and a flip-flop 104, an inverter 105, a control circuit 301 including flip-flops 106 to 110, and AND gates 111 to 114, a clock signal line 116 for the central processing unit, the I/O completion signal line 23 of FIG. 3, the memory write signal line 24, the input buffer activation signal line 27, the memory selection signal line 28, the I/O address signal line 29, and the address selection signal line 30.

The flip-flops 104 and 110 (FIG. 4B) are binary flip-flops and each inverts its output signal when it receives a logical "1" input signal. It is to be noted that the flip-flop 110 has a reset terminal (connected to the left side of the flip-flop) for forcibly resetting the flip-flop to a "a logical 0." The flip-flops 106 to 109 of FIG. 4B are a D-type flip-flop with set and reset functions. Each of them transfers information at the input terminal (D) to the output terminal (Q) every time the clock input terminal (CK) becomes logical "1." If a logical "1" signal is given to the reset terminal (R), the output terminal (Q) is reset to a logical "0" regardless of the information at the clock input terminal (CK). When each of the flip-flops 106 to 109 receives a logical "1" signal at the set terminal (S), the signal at the output terminal (Q) becomes a logical "1" irrespective of the signal at the clock input terminal (CK). In the shown flip-flops 106 to 109, it is assumed now that unused terminals are not depicted, that a logical "1" is always input to the flip-flop whose input terminal (D) is not described; and that a logical "0" is always given to the flip-flop whose reset and set terminals are not shown.

The address selection signal line 30 provides a timing for transferring a signal on the I/O address signal line 29 onto the address bus 12. The block-length set-up register 103 sets the block length depending on the fixed wiring arrangement and holds a value which is one-count larger than the block length.

The following description of FIG. 4B refers to the operation of the control unit 3 in a phase when the I/O memory area and the data processing memory area are interchanged and the first I/O operations are effected. The I/O counter 101 holds a value equal to the block length. The final data in the block is inputted and outputted in the I/O memory area, as described later. Upon such operations, a signal from the flip-flop 110 incrementally steps the counter 101 to a numerical value which is one-count larger than the block length. As a result, the content of the block-length set-up register 103 is coincident with the content of the counter 101. The coincident circuit 102 detects it to provide a coincident signal. The circuit 102 informs the central processing unit 1 that the I/O operations of one block of data have been finished, resets the counter 101 and the flip-flop 110, and inverts the state of the flip-flop 104. Upon the inversion of the flip-flop 104, the inverter 105 inverts the signal on the most significant bit side of the I/O address signal line 29 and on the memory selection signal line 28. When these signals are inverted, the data processing memory area and the I/O memory area are interchanged with each other in the memory area of the main memory 2, as described referring to FIGS. 1 and 3. On receiving the signal on the signal line 23, the central processing unit 1 initiates its processing of the data in the data processing memory area. The I/O counter 101 is reset and hence the unit 3 starts its I/O operations from the head address data in the I/O memory area.

The control circuit 301 produces timing signals so that the I/O control unit 3 performs the transmission and reception of various signals between the I/O memory area of the main memory 2 and the input and output buffer registers 4 and 5.

Figure 5:
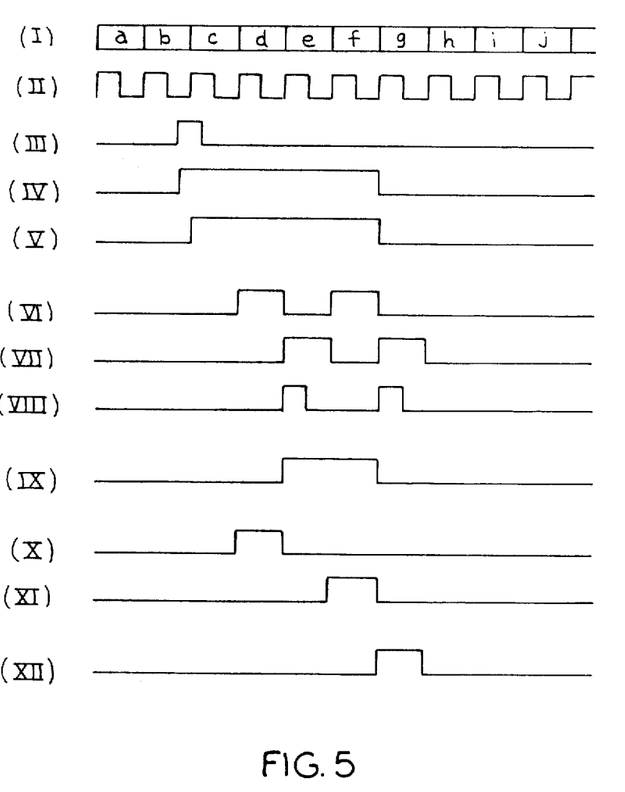
FIG. 5 includes a series of waveforms which are useful for explaining the operation of the embodiment of FIG. 3.

FIGS. 5(I) through (XII) are timing charts illustrating the operation in the respective portions of the conrol circuit 301 of FIG. 4B. The control circuit 301 is described with reference to FIGS. 5(I) through (XIII). For ease of explanation, the respective clock pulses are denoted by a, b, c, . . . as shown in FIG. 5(I).

Clock pulses (FIG. 5(II)) of the central processing unit 1 are sent onto the clock signal line 116. Assume that a sampling pulse is sent over the sampling pulse input line 22 in the middle of the clock pulse b (FIG. 5(III). At this time, the flip-flop 107 is set at a logical "1" (FIG. 5(IV)). The flip-flop 108 is used to synchronize the output of the flip-flop 107 with the clock pulses and becomes a logical "1" signal during the clock pulse c (FIG. 5(V)). A signal indicating a time when the central processing unit 1 does not access the main memory 2 appears on the vacant time signal line 25 during the clock pulses d and f. Then, the AND gate 111 produces an output signal (FIG. 5(VI)).

At the clock pulse d, the AND gate 111 produces a logical "" which requests, through the address selection signal line 30, the control part of the central processing unit 1 to send a signal over signal line 29 to the address bus 12. In other words, it informs the central processing unit 1 of the use of the address bus 12 by the I/O operations. As described above, the flip-flop 110 is reset (i.e., logical "0") so that the output signal of the AND gate 114 is a logical "1" and the output buffer strobe line 26 becomes a logical "1" (FIG. 5(X)). For this reason, the contents of the address selected by the signal on the I/O address signal line 29 of the main memory 2 through the bus 12 are transferred onto the output buffer register 5 of FIG. 3.

At the clock pulse e, the output signal of the AND gate 111 is shifted to the flip-flop 109 (FIG. 5(VII)), and the output signal of the flip-flop 109 and the clock are logically summed by the AND gate 112, which transfers a pulse (FIG. 5 (VIII)) to the flip-flop 110 and inverts the flip-flop 110 (FIG. 5(IX)) to indicate a logical "1."

At the clock pulse f, if a signal indicating a vacant time period during which the central processing unit 1 does not have access to the main memory 2 is given again on the vacant time signal line 25, the flip-flop 108 is kept at a logical "1" (FIG. 5(V))), and the output signal of the AND gate 111 becomes a logical "1" to connect the I/O address signal line 29 to the address bus 12 (FIG. 3). At this time, the flip-flop 110 produces a logical "1" (FIG. 5(IX)), the AND gate 113 produces a logical "1" with the result that signals on the input buffer activation signal line 27 and the memory write signal line 24 are also a logical "1." The content of the input buffer register 4 is transferred into the address location indicated by the signal on the signal line 29 of the main memory 2.

At the clock pulse g, the output signal of the AND gate 111 is transferred to the flip-flop 109 (FIG. 5(VII)). The output of the flip-flop 109 and the clock pulse on the clock signal line 116 are logically summed by the AND gate 112. The pulses shown in FIG. 5(VIII) are transferred to the flip-flop 110. As a result, the flip-flop 110 inverts its state (FIG. 5(IX)) to become a logical "0." The output signal of the flip-flop 110 is transferred to the I/O counter 101. The counter 101 is advanced by one count when the output signal of the flip-flop 110 is shifted from a logical "1" to a"0." The flip-flop 106 assumes a logical "1" (FIG. 5(XII)) to retard the output signal of the AND gate 113 by one clock period. The output signal of the flip-flop 106 is connected to the reset terminals of the flip-flops 107 and 108. Therefore, the output signals of the flip-flops are reset to a logical "0" at the leading edge of the clock pulse g (FIGS. 5(IV) and (V)).

During the period from the clock pulse until the supply of a pulse over the sampling pulse input line 22, the flip-flop 108 remains at a logical "0," even if the signal on the vacant time signal line 25 is a logical "1." Accordingly, the output signal of the AND gate 111 still remains at logical "0" and, thus, no I/O operations are carried out.

If the sampling pulse enables the control circuit 301 to perform the I/O operations and if the signal on the vacant time signal line 25 maintains a logical "1" during two clock periods, the AND gate 112 transforms the logical "1" signal into two independent pulses to perform the I/O operations.

Every time the vacant time signal on the line 25 is supplied from the central processing unit 1 to the I/O control unit 3, the vacant time signal may be used in place of the address selection signal on conductor 30 for the control part of the central processing unit 1. This, however, is not essential to the invention. That is to say, when the operation of the central processing unit 1 is checked by monitoring the address bus 12, it is preferable for the address bus 12 to be kept connected to the central processing unit 1 for a longer period. The address selection signal on conductor 30 is used to minmize the time duration that the address bus 12 is occupied by the I/O control unit 3.

If the block of data is processed in fast Fourier transform or the like, only one data suffices for the capacity of the I/O buffer registers and each data may be inputted one by one for each sampling time. The I/O control unit has a function for interchanging the I/O memory area and the data processing memory area in the main memory. The I/O control unit also performs the I/O operations during a time period while the central processing unit does not have access to the main memory. Therefore, the data processing time by the central processing unit may fully be separated from the I/O processing time by the I/O control unit, thereby to relieve a strict requirement of a high-speed operation which is necessary for a real time signal processing. Additionally, the central processing unit always gives access only to the data processing memory area so that the program describing the data processing steps by the central processing unit need not describe the I/O processing steps, thus facilitating the program preparation.

In the embodiment described above, the block-length set-up register sets the block length depending on the wiring arrangement. Alternatively, the register may be connected to the memory output bus and the block length may be set through programming. Also, in the described embodiment, data transfer to the output buffer register and from the input buffer register to the main memory are performed during a clock pulse which is selected in dependence upon an individual vacant time signal. However, it is possible to effect the I/O operations during a clock pulse which is determined by one vacant time signal.

Those who are skilled in the art will readily perceive how to modify the system. Therefore, the appended claims are to be construed to cover all equivalent structures.

What is claimed is:

1. A data processing system for processing input data received in a timed relationship with a sampling pulse and for processing output data in said timed relationship, said system having a memory means for storing data used for calculation and input/output, said memory means including a data input/output memory area and a data processing memory area, a central processing unit with a cycle time which is shorter than the repetition period of said sampling pulse for producing address bits giving access to said memory means and executing an operation on said input data, an input buffer register means for inputting said input data into said central processing unit, an output buffer register means for outputting the data processed by said central processing unit, and an input/output control means for controlling a data-transferring operation between said memory means and either said input or output buffer register means and disposed between said central processing unit and said input and output buffer register means, said input/output control means comprising:

a. an input/output counter means for performing said data-transferring operation and cyclically producing, independently of said central processing unit, address bits to give access to said memory means in order to input and output data to and from said memory means;
 b. a memory selection means for adding a specific one bit to the address bits fed from the central processing unit so that said data processing area of the memory means is accessed to transfer data between said central processing unit and the memory means and for adding said specific one bit after logical inversion in response to said sampling pulse and to a signal representative of the absence of an access by said central processing unit to said memory means to the address bits fed from said input/output counter means so that said data input/output area is accessed to transfer from said input/output counter means into said output buffer register means to data stored in the address of said memory means designated by said address bits to which said specific one bit after logical inversion is added, and to transfer the data stored in said input buffer register means into the memory means at the address designated by the address bits to which said specific one bit after logical inversion is added;
 c. means responsive to a completion of a cycle of said input/output counter means by one block of data and to the completion of the input and output to and from said memory means of one block of data for inverting the output signal of said memory selection means, to inform said central processing unit of the completion of the input and output operations responsive to one block of data, and for resetting said input/output counter means;
 d. means responsive to the completion of the data transfer between said memory means and said input and output buffer register means for advancing said input/output counter means by a given number and for inhibiting the input/output operations until the next sampling pulse is given; and
 e. wherein the area of said memory means where data stored are subjected to processing by said central processing unit is different from another area of said memory means where data transfer is carried out between said input and output buffer register means, and wherein the data transfer between said input and output buffer register means and said memory means is performed during a time period when said central processing unit does not have access to said memory means, whereby data are transferred one by one every time said sampling pulse is given.

2. A data-processing system comprising clock means for establishing a timed relationship, input data being received for processing by said system in the form of sample pulses picked up during cyclically recurring periods in said timed relationship, means responsive to said timed relationship for transmitting data output which is processed responsive to said sample pulses, memory means having first and second major memory areas, each major memory area containing a plurality of local storage areas individually identified by local addresses, one of said major memory area being used as a data processing memory area while the other of said major memory areas is being used as an input/output processing memory area, means for periodically reversing the functions of said first and second major memory areas, buffer register means for temporarily storing data to interface a time cycle of a central processing means with said timed relationship during which sample pulses are received, central processing means for processing data stored in one major area while data stored in the other major area is being transferred between said memory means and said buffer register means, said central processing means having a time cycle which is shorter than the cyclically recurring periods in which said sample pulses appear, the data transfer occurring while said central processing means does not have access to said memory means, counter means including a discrete number of steps which constitute a count cycle, means responsive to the completion of each count cycle for informing the central processing means that a data input or output sequence has been completed and for resetting said counter means, input/output control means including said counter means for generating said addresses of said local storage areas independently of said central processing means, said input/output control means being coupled between said central processing means and said buffer register means, said control means also including a memory selection means for adding a selection bit to the addresses of each storage memory area for indicating whether the storage memory area is in the first or the second major memory area, means responsive to said generated addresses for inputting and outputting data stored in the addressed storage area, means jointly responsive to a sample pulse and to a signal which indicates that the central processing means does not have access to said memory means for transferring data between said buffer register means and a storage area in said memory means which is identified by an address from said counter means, means responsive to the completion of said data transfer for advancing said counter means through said count cycle, and means responsive to the advance of said count cycle for inhibiting further input operation until the next sample pulse is received.

* * * * *

UNITED STATES PATENT AND TRADEMARK OFFICE
CERTIFICATE OF CORRECTION

PATENT NO. : 4,287,558
DATED : September 1, 1981
INVENTOR(S) : TAKAO NISHITANI

It is certified that error appears in the above—identified patent and that said Letters Patent is hereby corrected as shown below:

Col. 2, Line 52, after "input", "out" should be --output--;

Col. 9, Line 6, after "through", "(XIII)" should be --(XII)--;

Col. 9, Line 23, after "logical", "  "" " should be --"1"--;

Claim 2, Line 11, "area" should be --areas--.

Signed and Sealed this

Twenty-sixth Day of January 1982

[SEAL]

Attest:

Attesting Officer

GERALD J. MOSSINGHOFF

Commissioner of Patents and Trademarks